W. H. KIRKPATRICK.
WORK BENCH SCREW.
APPLICATION FILED APR. 25, 1910.
978,900.
Patented Dec. 20, 1910.
2 SHEETS—SHEET 1.
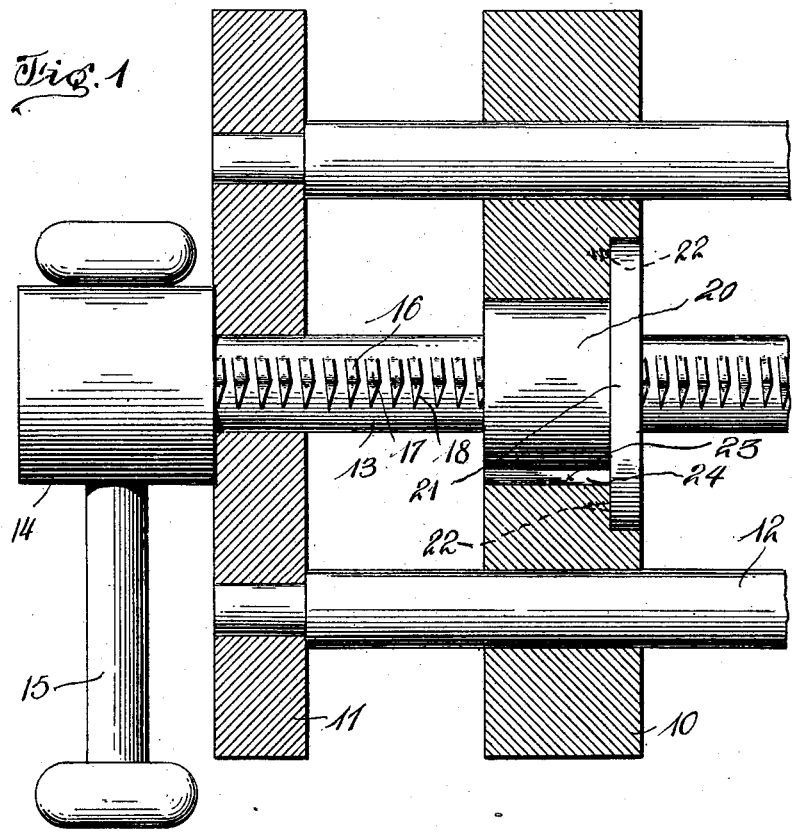
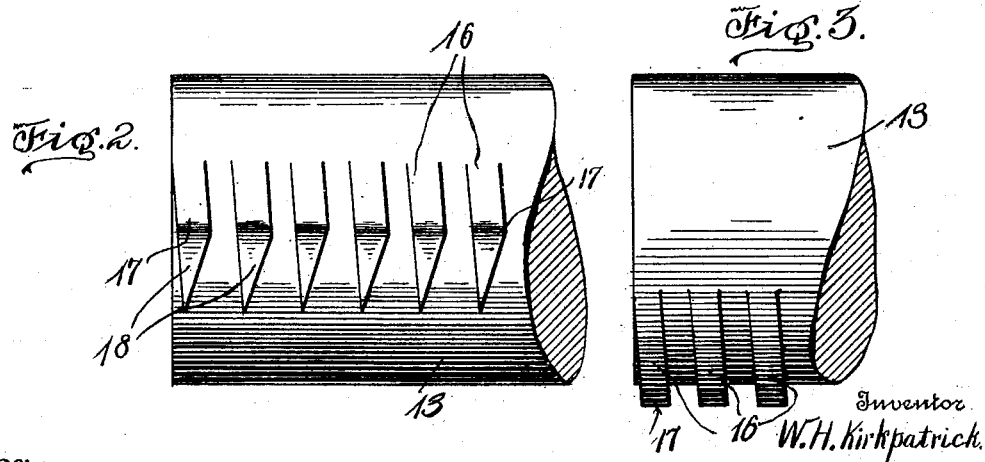

W. H. KIRKPATRICK.
WORK BENCH SCREW.
APPLICATION FILED APR. 25, 1910.
978,900.
Patented Dec. 20, 1910.
2 SHEETS—SHEET 2.
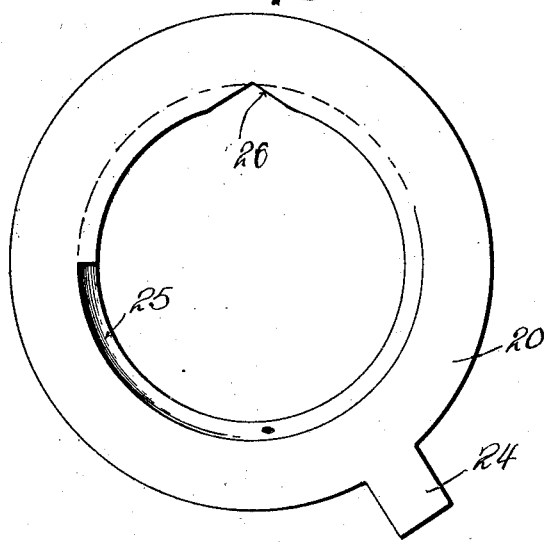
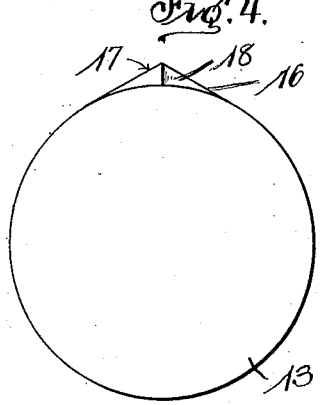
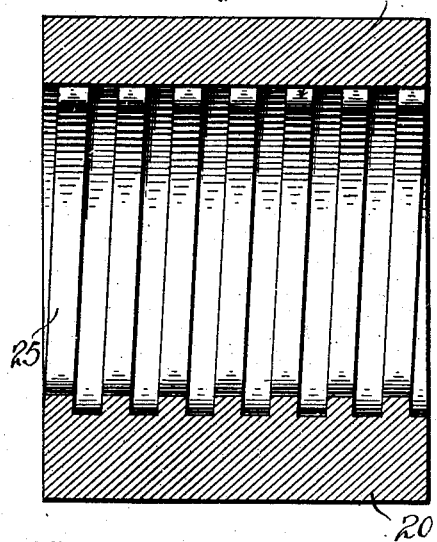
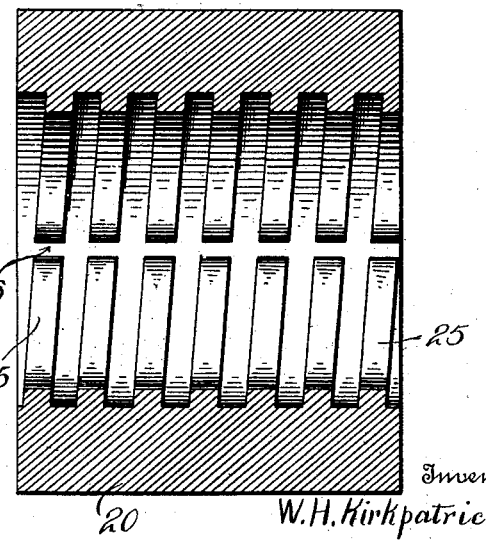
Inventor
W. H. Kirkpatrick

UNITED STATES PATENT OFFICE.

WILLIE H. KIRKPATRICK, OF CELINA, TENNESSEE.

WORK-BENCH SCREW.

978,900.  Specification of Letters Patent.  Patented Dec. 20, 1910.

Application filed April 25, 1910. Serial No. 557,463.

*To all whom it may concern:*

Be it known that I, WILLIE H. KIRKPATRICK, a citizen of the United States, residing at Celina, in the county of Clay, State of Tennessee, have invented certain new and useful Improvements in Work-Bench Screws; and I do hereby declare the following to be a full, clear, and exact description of the invention, such as will enable others skilled in the art to which it appertains to make and use the same.

This invention relates to work bench clamps and has special reference to a novel form of screw and nut for such clamps.

The principal object of the invention is to provide a screw and nut of improved construction and of the interrupted type.

With the above and other objects in view, the invention consists in general of certain novel details of construction and combinations of parts hereinafter fully described, illustrated in the accompanying drawings, and specifically set forth in the claim.

In the accompanying drawings, like characters of reference indicate like parts in the several views, and:—Figure 1 is a section through a portion of a work bench showing a clamp fitted thereon and provided with the improved screw. Fig. 2 is an enlarged face view of a portion of such a screw. Fig. 3 is a similar side view of such a screw. Fig. 4 is an end view of such a screw. Fig. 5 is an end view of the nut used with this screw. Fig. 6 is a vertical section through such a nut. Fig. 7 is a horizontal section through Fig. 5 looking upward.

At 10 is indicated the usual standard with which the clamp 11 is adapted to coact, said clamp being guided to keep its proper position with reference to the standard by means of guide bars 12. The screw is provided with the usual body 13, head 14 and lever 15. On the body of this screw is formed a series of thread portions 16 which are alined side by side along said body. The faces of these thread portions are beveled off as best seen at 17 in Fig. 4 and there is thus formed a series of longitudinally acuminate thread portions. The forward or entering end of each of these portions has its rear flank laterally beveled as at 18. The nut used with this screw is provided with a body portion 20 and is preferably equipped with a flange 21 adapted to receive holding screws 22 for the purpose of retaining said nut within a socket or opening 23 formed in the standard 10. This nut is furthermore provided with a stop fin 24 so that the rotative stress is removed from the screws 22 when the clamp screw is revolved. Interiorly this nut is provided with the usual threads 25 and through the bore of the nut is formed a longitudinal V-shaped groove 26 which corresponds in size to the acuminate thread portions 16. Both the screw and the nut may be either single or plural threaded as desired as the number of threads employed in no way affects the device.

In using this screw and nut the article to be grasped is placed between the clamp 11 and standard 10 and the screw rotated until the thread portions 16 are in alinement with the notch 26. The screw is then pushed bodily in carrying the clamp with it. When forward motion is arrested by contact with the object to be clamped the screw is given a turn to the right or left according to the pitch of the screw. This will cause the beveled flank faces 18 to engage the threads 25 and force the screw solidly in so that the article is firmly grasped. By reason of the acuminate arrangement of the thread portions and the V-shaped slot in the nut but little of the thread will be cut from the nut so that an adjustment of practically the entire pitch distance of the screw or nut may be obtained, thus giving a very wide latitude of screw adjustment while permitting the rapid adjustment common to interrupted thread screws.

There has thus been provided a simple and efficient device of the kind described and for the purpose specified.

Having thus described the invention, what is claimed as new, is:—

In combination, an interrupted screw comprising a body provided with a single series of longitudinally acuminate thread portions alined side by side along said body, each of said thread portions having one end laterally beveled and the other end provided with parallel flanks; and a nut having a single series of alined acuminate notches cut longitudinally of its bore through its threads, said notches being of corresponding size to the thread portions of said screw.

In testimony whereof, I affix my signature, in presence of two witnesses.

WILLIE H. KIRKPATRICK.

Witnesses:
ISAIAH FITZGERALD,
J. F. MONROE.